United States Patent [19]

Ikeda et al.

[11] 4,371,597
[45] Feb. 1, 1983

[54] LAYER-BUILT CELL

[75] Inventors: Hironosuke Ikeda, Hirakata; Satoshi Narukawa; Shigehiro Nakaido, both of Kobe, all of Japan

[73] Assignee: Sanyo Electric Co., Ltd., Moriguchi, Japan

[21] Appl. No.: 228,685

[22] Filed: Jan. 26, 1981

[30] Foreign Application Priority Data

Jan. 31, 1980 [JP] Japan .................................. 55-11073

[51] Int. Cl.³ ........................................... H01M 2/24
[52] U.S. Cl. .................................. 429/153; 429/158; 429/160; 429/161
[58] Field of Search ................ 429/152, 153, 156–161, 429/178

[56] References Cited

U.S. PATENT DOCUMENTS

| | | | |
|---|---|---|---|
| 2,702,310 | 2/1955 | Kaye et al. ..................... | 429/160 X |
| 3,056,850 | 10/1962 | Rauske et al. ................... | 429/157 |
| 3,253,959 | 5/1966 | Jones ............................... | 429/161 X |
| 3,320,095 | 5/1967 | Bingeman et al. ................. | 429/151 |
| 3,553,033 | 1/1971 | Page .................................. | 429/151 |
| 3,600,233 | 8/1971 | Coffey et al. .................... | 429/160 X |
| 3,801,373 | 4/1974 | Spellman ........................ | 429/160 X |

*Primary Examiner*—Anthony Skapars
*Attorney, Agent, or Firm*—Darby & Darby

[57] ABSTRACT

The present application discloses a layer-built cell comprising: a cell assembly formed by putting together a plurality of elemental cells each having thereon a positive terminal and a negative terminal, such that the positive terminals and the negative terminals of the respective elemental cells are located on the same plane; a first insulating plate disposed on the cell assembly and having therein a plurality of through-bores; connecting pieces located on the first insulating plate and passing through the through-bores to connect the elemental cells to one another in series; a second insulating plate disposed on the connecting pieces and having two through-bores; positive and negative lead pieces passing through and projected from the through-bores in the first and second insulating plates; and a terminal plate disposed on the second insulating plate and having thereon a positive external terminal connected to the positive lead piece and a negative external terminal connected to the negative lead piece. Thus, according to the layer-built cell of the present invention, it is possible to prevent undesired electrical connects between the plurality of connecting pieces and the positive and negative lead pieces. Furthermore, according to the present invention, since all elemental cells can be used in the same positional direction, the assembling work may be very simplified.

4 Claims, 6 Drawing Figures

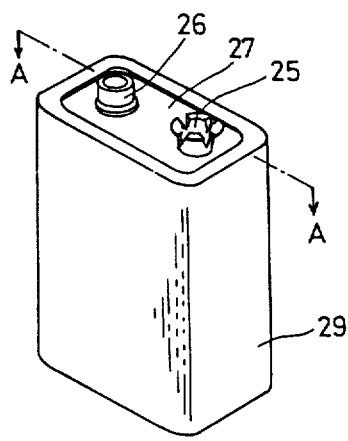
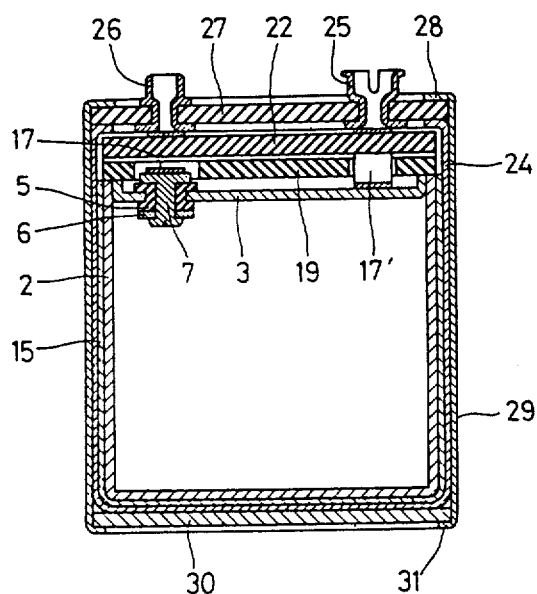
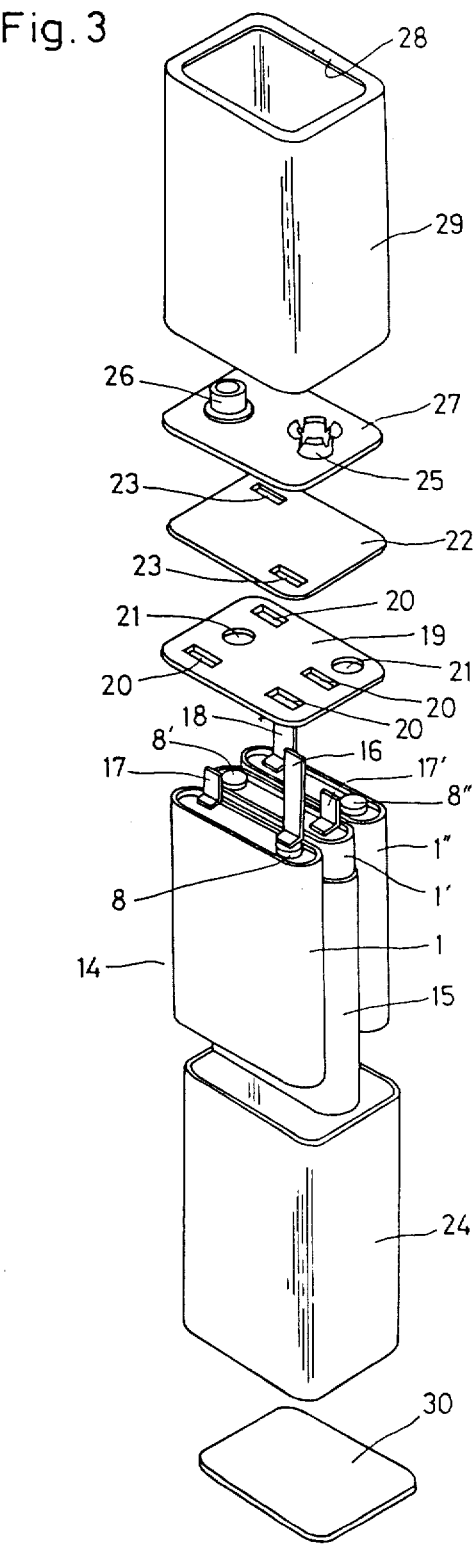

LAYER-BUILT CELL

FIELD OF THE INVENTION

The present invention relates to a layer-built cell formed by putting together a plurality of elemental cells each having thereon a positive terminal and a negative terminal.

BACKGROUND OF THE INVENTION

In a conventional cell, for example the 006P-type cell for producing 9 V, six elemental cells each of 1.5 V are electrically connected in series and are housed in an outer case.

In a 1.5 V-alkaline cell of the cylindrical type, the positive terminal and the negative terminal are respectively located on the top and bottom surfaces of the cell. Therefore, where six alkaline cells of this kind are used as elemental cells and are electrically connected in series to one another, in two rows in each of which three cells are arranged with their positive terminals oriented in the same direction, such arrangement requires a long connecting piece for connecting the negative terminal at the bottom of the elemental cell in one row to the positive terminal at the top surface of the elemental cell in the other row. This arrangement and also requires a long connecting piece for connecting the negative terminal at the bottom of the elemental cell in said other row to the negative terminal disposed at the top surface of the entire cell unit. Thus, such arrangement causes the insulating mechanism and the assembling work to become complicated and troublesome.

On the other hand, where the positive terminals of three elemental cells are oriented in one direction and the negative terminals of other three elemental cells are oriented in said one direction with the respective elemental cells alternately arranged in one line, such arrangement can shorten the lengths of the connecting pieces for connecting the positive terminals of the elemental cells to the negative terminals of the adjacent elemental cells. However, such arrangement that the positive terminals of the respective elemental cells are not oriented in one direction, causes the entire cell structure to become unstable and complicated.

Since the outer case for the 006P-type cell is of the square shape, the use of cylindrical elemental cells presents a disadvantage that the spacial volume of the outer case is increased.

Furthermore, in the 006P-type cell, a large number of elemental cells are required. Each of the elemental cells is adjacent to at least two other elemental cells. In order to prevent undesired electrical contacts between the respective adjacent elemental cells, the respective elemental cells should be covered with insulating sheets, making the assembling of the elemental cells become disadvantageously troublesome.

DISCLOSURE OF THE INVENTION

The present invention relates to a layer-built cell and includes a cell assembly formed by putting together a plurality of elemental cells each having thereon a positive terminal and a negative terminal, such that the terminals of the respective elemental cells are located on the same plane. A first insulating plate is disposed above the cell assembly and has therein a plurality of through-bores and connecting pieces located on the first insulating plate pass through the through-bores to connect the elemental cells to one another in series. A second insulating plate is disposed above the connecting pieces has two through-bores and positive and negative lead pieces extend through the through-bores of the first and second insulating plates. A terminal plate is disposed on the second insulating plate and has thereon a positive external terminal connected to the positive lead piece and a negative external terminal connected to the negative lead piece.

BRIEF DESCRIPTION OF THE DRAWINGS

The present invention will further be described, by way of example, with reference to the accompanying drawings, in which:

FIG. 1 is a perspective view of an embodiment of layer-built cell in accordance with the present invention;

FIG. 2 is a section view taken along the line A—A in FIG. 1;

FIG. 3 is a disassembled perspective view of FIG. 1;

DETAILED DESCRIPTION OF THE PREFERRED EMBODIMENTS

The description hereinafter will discuss in detail an embodiment of layer-built cell in accordance with the present invention with reference to FIGS. 1 to 6.

Figure 5:
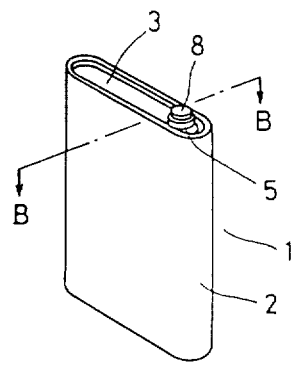
FIG. 5 is a perspective view of an elemental cell used in FIG. 1.
Figure 6:
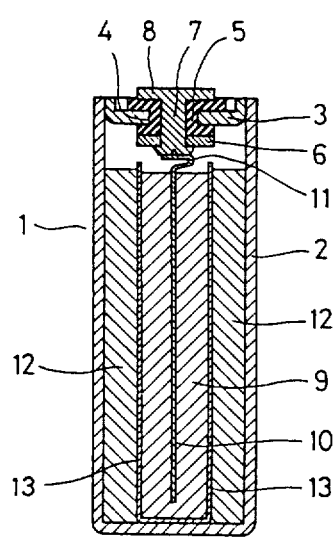
FIG. 6 is a section view taken along the line B—B in FIG. 5.

First of all, the description will be made of an elemental cell used in the layer-built cell of the present invention, with reference to FIGS. 5 and 6.

A 3 V-elemental cell 1 is a square-shape lithium-manganese dioxide cell. An outer vessel 2 for the elemental cell 1 is formed by casting a metallic sheet such as a stainless steel sheet, and serves as a positive terminal.

A closure cover 3 for the outer vessel 2 is made of a metallic sheet such as a stainless sheet, like the outer vessel 2. The closure cover 3 is secured to the outer vessel 2 by such as laser-welding, and may be utilized as a positive terminal. The closure cover 3 has therein a through-bore 4, into which an insulating cylindrical member 5 made of a TEFLON resin or the like is fitted. The upper and lower flanges of this insulating cylindrical member 5 cover the upper and lower surfaces of the closure cover 3, respectively.

A metallic ring 6 is disposed at the bottom of the insulating cylindrical member 5. A negative terminal pin 7 is inserted into the hollow portion of the insulating cylindrical member 5.

A circular negative terminal 8 is formed at the upper end of the negative terminal pin 7 in a unitary construction therewith. The negative terminal pin 7 is calked at the lower end thereof by the metallic ring 6, so that the negative terminal pin 7 is secured to the closure cover 3 in an electrically insulative manner and in an air- and liquid-tight manner.

A negative electrode 9 is made of a rolled lithium plate in which a collector member 10 is embedded. The collector member 10 has a projecting tab portion 11, which is secured to the lower end of the negative terminal pin 7 such as by spot-welding. Thus, the negative electrode 9 is electrically connected to the negative terminal pin 7 through the projecting tab 11 of the collector member 10.

Positive electrodes 12 are formed with manganese dioxide utilized as active material. These positive electrodes 12 are disposed at the both sides with respect to the negative electrode 9 through separator layers 13 impregnated with an organic electrolyte. The positive electrodes 12 come in contact with the outer vessel 2, so as to be electrically connected therewith.

The description hereinafter will discuss a layer-built cell of the 006P type using the elemental cells 1, and its assembly method, with reference to FIGS. 1 to 4, and more particularly to FIG. 3.

First of all, first, second and third elemental cells 1, 1' and 1" are put together to form a cell assembly 14 such that the negative terminals 8, 8' and 8" of the first, second and third elemental cells 1, 1' and 1" are not aligned with one another but are located in a zigzag manner.

An insulating member 15 of conforming shape covers the second elemental cell 1' located at the center among three elemental cells 1, 1' and 1".

A negative lead piece 16 is secured to the negative terminal 8 of the first elemental cell 1. Conductive connecting pieces 17 and 17' and a conductive positive lead piece 18 are secured to the respective closure covers 3 of the elemental cells 1, 1' and 1" at the opposite sides thereof with respect to the negative terminals 8, 8' and 8".

Disposed on the top of the cell assembly 14 is a first insulating plate 19 having therein four rectangular-shaped bores 20 and two circular bores 21. The negative lead piece 16, the connecting pieces 17 and 17', and the positive lead piece 18 pass through the four rectangular bores 20, respectively.

Figure 4:
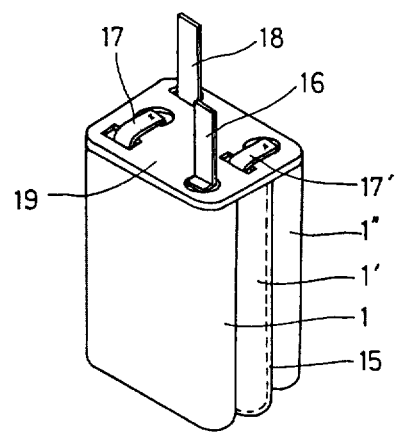
FIG. 4 is a perspective view of a cell assembly in the course of assembling the layer-built cell in FIG. 1.

After having passed through the bore 20, the connecting piece 17 of the first elemental cell 1 is turned on the first insulating plate 19 to pass through the adjacent circular bore 21 (FIG. 4) and is then electrically connected to the negative terminal 8' of the second elemental cell 1' such as by spot-welding. Similarly, the connecting piece 17' of the second elemental cell 1' is electrically connected to the negative terminal 8" of the third elemental cell 1". Thus, three elemental cells 1, 1' and 1" of the cell assembly 14 are electrically connected in series, which status is shown in FIG. 4.

Disposed on the first insulating plate 19 is a second insulating plate 22 having therein two through-bores 23. The negative lead piece 16 and the positive lead piece 18 pass through these bores 23, respectively. This second insulating plate 22 enables to prevent completely contact between the negative lead piece 16 and the connecting piece 17' and also contact between the positive lead piece 18 and the connecting piece 17.

Then, the cell assembly 14 is covered with an insulating member 24, for example an insulating thermocontractile tube, so as to securely fix three elemental cells 1, 1' and 1" to one another.

Disposed on the second insulating plate 22 is an insulating terminal plate 27 having a negative external terminal 25 and a positive external terminal 26 which pass through the terminal plate 27. The negative external terminal 25 and the positive external terminal 26 are electrically connected to the negative lead piece 16 and the positive lead piece 18, respectively.

An outer case 29 having an inner flange 28 at the upper end thereof is put onto the cell assembly 14 from the top, and a bottom plate 30 is put to the bottom of the cell assembly 14. The lower edge 31 of the outer case 29 is fastened to the bottom plate 30, thus forming a layer-built cell shown in FIG. 1.

It is to be understood that, although three elemental cells 1 have been used in the embodiment discussed hereinbefore, the number of the elemental cells is not limited to 3, but four or more electrical cells may be used.

Industrial Utility

A plurality of elemental cells each having a positive terminal and a negative terminal at the top surface thereof are put together to form a cell assembly such that the respective terminals of the elemental cells are located on the same plane. Disposed on the cell assembly is a first insulating plate having therein a plurality of throughbores. The elemental cells are electrically connected in series by the connecting pieces extending over this first insulating plate, thereby to prevent undesired electrical contacts between adjacent elemental cells, otherwise caused by the connecting pieces. Disposed on the connecting pieces is a second insulating plate having therein two through-bores, through which the positive lead piece and the negative lead piece of the cell assembly pass. Such arrangement prevents undesired electrical contacts between the connecting pieces and the lead pieces. Thus, all elemental cells can be used in the same positional direction, so that the assembling work may be facilitated.

Where 3 V-organic electrolyte cells of the square type are used as elemental cells, only three elemental cells are required for forming a 006P-type cell. Furthermore, in order to prevent undesired electrical contacts between adjacent elemental cells, the only elemental cell located at the center in the cell assembly is required to be covered by an insulating member, whereby the cell assembling work may be facilitated. Moreover, according to the present invention, since square-type elemental cells are used, the spacial volume may be reduced.

What we claim:
1. A layer-built cell comprising:
    a cell assembly formed by putting together a plurality of elemental cells each having thereon a positive terminal and a negative terminal such that said terminals of said plurality of elemental cells are located on the same plane;
    a first insulating plate disposed on said cell assembly and having therein a plurality of through-bores;
    connecting pieces passing through said through-bores of said first insulating plate and over the surface thereof to connect the positive and negative terminals of said plurality of elemental cells electrically in series;
    a second insulating plate disposed above said connecting pieces and having two through-bores;
    a positive and a negative lead piece each connected to and extending from a respective positive and negative terminal of a cell of the assembly and passing through said through-bores in said first insulating plate and said through-bores in said second insulating plate; and
    a terminal plate disposed above said second insulating plate and having thereon a positive external terminal connected to said positive lead piece and a negative external terminal connected to said negative lead piece.
2. The layer-built cell as set forth in claim 1, wherein the elemental cells are organic electrolyte cells and the cell assembly has three such elemental cells, the elemen- tal cell located at the center of said cell assembly being covered with an insulating member.

3. The layer-built cell as set forth in claim 1 or 2, further comprising an outer case which is put onto the cell assembly and from which at least the positive external terminal and the negative external terminal project.

4. A layer-built cell as in claim 1 wherein each elemental cell has an outer casing of electrically conductive material forming a cell electrode, said cell assembly being formed by three said elemental cells placed adjacent one another, and an insulating member covering the outer casing of the center one of the three elemental cells.

* * * * *